Figure 4:
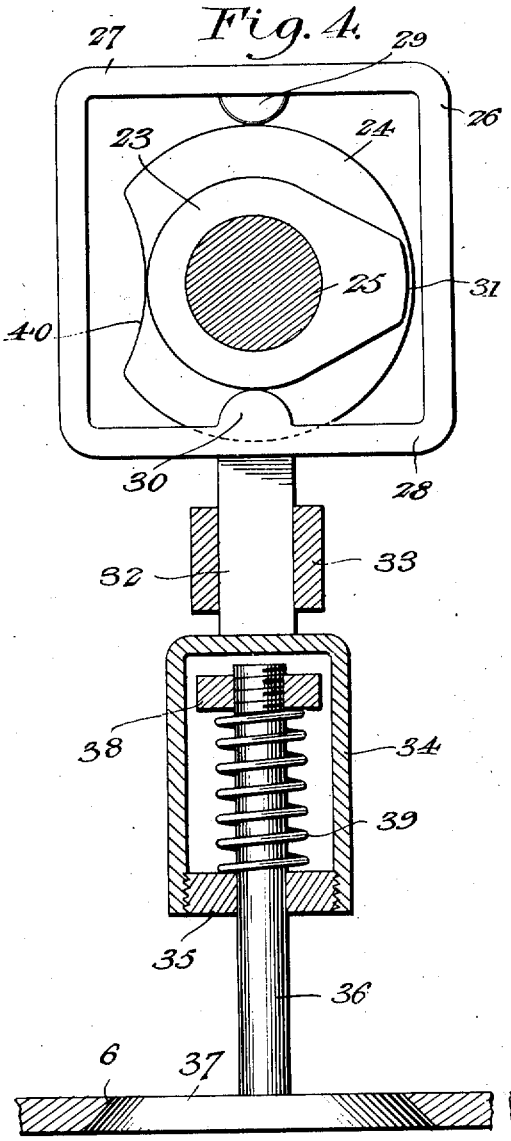

F. MacVICAR.
VALVE.
APPLICATION FILED SEPT. 12, 1916.
Reissued Dec. 12, 1916.
14,228.
2 SHEETS—SHEET 1.
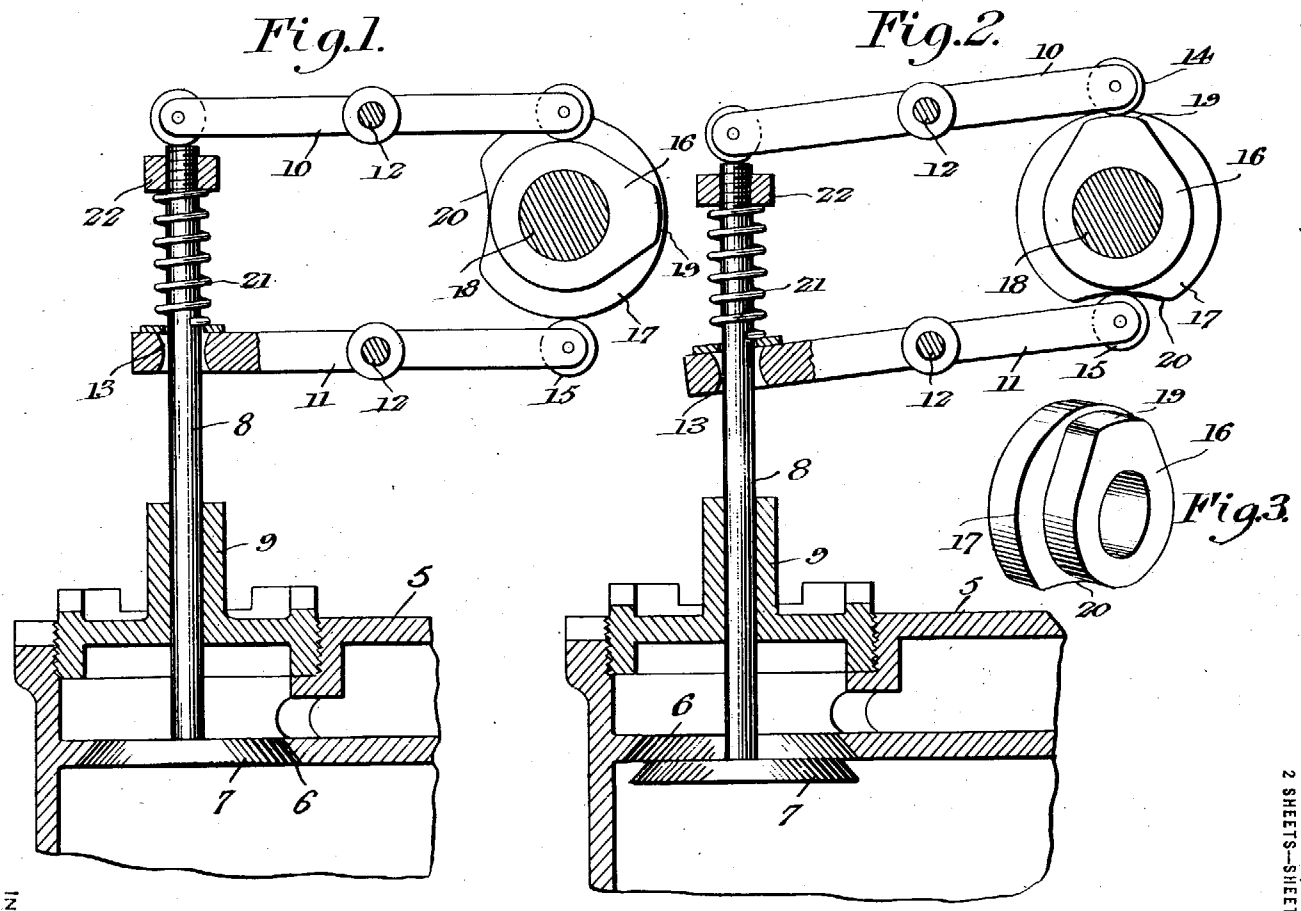
WITNESSES
Frederick W. Ely
R. M. Smith.
INVENTOR
F. MacVicar:
BY Victor J. Evans
ATTORNEY F. MacVICAR.

VALVE.

APPLICATION FILED SEPT. 12, 1916.

Reissued Dec. 12, 1916.

14,228.

2 SHEETS—SHEET 2.

WITNESSES

Frederick W. Ely

R. M. Smith.

INVENTOR

F. MacVicar.

BY Victor J. Evans

ATTORNEY

UNITED STATES PATENT OFFICE.

FRANK MacVICAR, OF SYRACUSE, NEW YORK.

VALVE.

14,228. Specification of Reissued Letters Patent. Reissued Dec. 12, 1916.

Original No. 1,185,516, dated May 30, 1916, Serial No. 63,775, filed November 27, 1915. Application for reissue filed September 12, 1916. Serial No. 119,770.

*To all whom it may concern:*

Be it known that I, FRANK MacVICAR, a citizen of the United States, residing at Syracuse, in the county of Onondaga and State of New York, have invented new and useful Improvements in Valves, of which the following is a specification.

This invention relates to internal combustion engines and particularly to mechanism for positively controlling the opening and closing movements of the valve therefor.

The chief object of the present invention is to provide cam mechanism for positively opening and closing either the intake or exhaust valve of an engine of the class described and at the same time prevent the closing cam from bottoming in case any obstructing material such as carbon prevents the valve from properly seating, thereby avoiding the consequent friction or binding between the valve closing cam and the valve actuating member.

A further object of the invention is to provide yieldable means between an intake or exhaust valve and the closing cam therefor which will prevent the cam from bottoming and which will also insure continuous coöperative contact between the cam and valve actuating member.

The nature and advantages of the invention will be thoroughly understood when the following description is taken in connection with the accompanying drawings, the invention residing in the construction, combination and arrangement of parts as claimed.

In the drawings forming part of this specification like numerals of reference indicate similar parts throughout the several views and wherein:—

Figure 5:
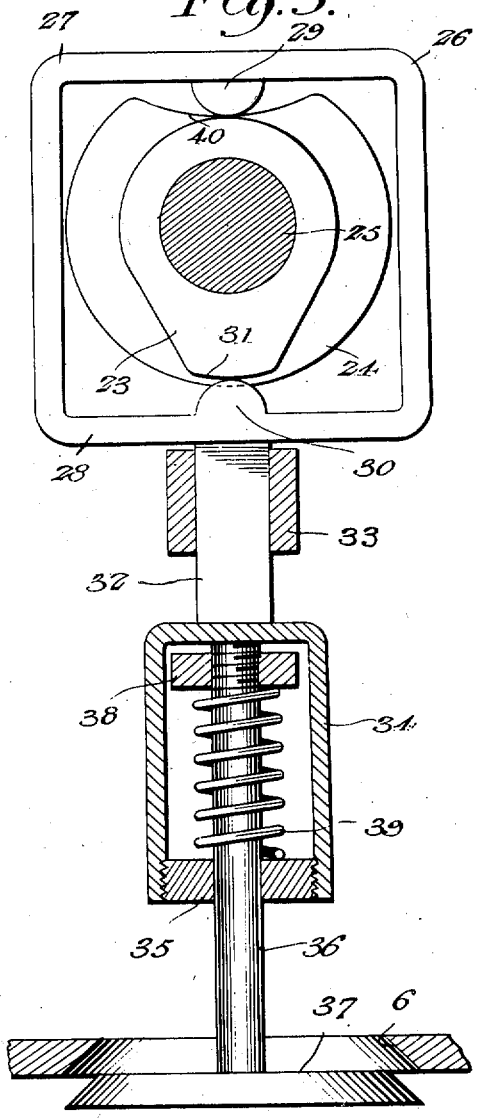

Figure 1 is an elevation of the invention showing the normal position of parts when the valve is closed. Fig. 2 is a similar view showing the position of the parts when the valve is opened. Fig. 3 is a perspective view of the cam. Fig. 4 is an elevation of a modified form of the invention showing the valve closed. Fig. 5 is a similar view showing the valve opened.

Referring to the drawings in detail, 5 indicates the engine cylinder having the usual valve seat 6 and the inwardly opening valve 7, the stem 8 of the latter being slidably mounted within the guide 9 and adapted to be operated in the manner to be presently described. As shown in Figs. 1 and 2, I make use of valve actuating means shown as consisting of a pair of spaced superimposed rocker arms 10 and 11 respectively, which arms are fulcrumed at a point approximately midway of their length as at 13. The rocker arm 10 is operatively associated in any suitable manner with the upper end of the valve stem 8 while the lowermost rocker 11 has its forward end provided with an opening 13 through which the stem is adapted to slide. The opposite end of each rocker carries a roller 14 and 15 the former normally engaging the cam 16, while the roller 15 normally engages the cam 17, which cams are arranged upon the shaft 18. Encircling the stem 8 is a coil spring 21 disposed between the rocker arms 11 and 10 respectively. The spring has one end seated upon the forward end of the rocker arm 11 while the opposite end of the spring engages a nut 22 adjustably mounted upon the valve stem 8 at its upper end, and by means of which the tension of the spring can be readily and easily regulated. In the position of parts shown in Fig. 1, the spring is compressed and under tension, for the express purpose of maintaining the roller 15 in constant engagement with the closing cam, irrespective of the speed at which these cams may travel. The cam 16 is of usual construction, and when the actuating surface 19 thereof engages the roller 14, the rocker arm 10 is moved upon its fulcrum depressing the valve stem 8 and moving the valve to opened position as clearly illustrated in Fig. 2. In this position of parts the roller 15 is received within the depressed or dished portion 20 of the cam 17, which portion is arranged diametrically opposite the actuating surface 19 of the cam 16 and which arrangement permits of the expansion of the spring 21.

It is of course to be understood that as the actuating surface 19 of the cam 16 is moved out of engagement with the roller 14, the cam 16 is also being rotated to bring its deepest portion of the depression 20 into active engagement with the roller 15, at which time the stem 8 is moved in a reverse direction for the purpose of seating the valve 7. The closing cam 17 has a greater throw than that possessed by the opening cam 16, by reason of which fact the spring 21 is not in any way affected by the operation of the cam 17 in the closing of the valve. However subsequent to the seating of the valve 7, the spring 21 serving as a cushioning means to take care of the extra throw of the closing cam 17, is compressed and movement equal to the difference between the throws of the respective cams, during which operation of the spring, the latter is again placed under tension in the position of parts shown in Fig. 1. This construction and contemplated operation effectively closes the valve without the cam bottoming when the valve strikes its seat, and provides means whereby the cams are operated with considerably less power, and also less wear upon the cam.

In the modified form of the invention disclosed in Figs. 3 to 5, the cams 23 and 24 are constructed and arranged upon the shaft 25 in identically the same manner as the cams 16 and 17 respectively as hereinabove described. However the valve actuating means as shown in this form of the invention preferably consists of a rectangular frame 26 within which the shaft 25 and the cams are arranged to operate. It might here be stated that this embodiment of the invention may be arranged immediately above the valve in the manner illustrated or it can be used by placing the cam shaft in the base of the motor and also where the valves are in horizontal position in the cylinders. The upper and lower members 27 and 28 of the frame are provided with semicircular projections 29 and 30 respectively, the closing cam 24 operating upon the projection 29 around its entire circumference, while the actuating surface 21 of the opening cam 23 operates upon the projection 30. The lower member 28 has depending centrally therefrom an extension 32 slidably fitted within a suitable guide 33 and carries at its free end a casing 34. The lower end of the casing 34 is closed by means of a guide plug 35 which is adjustably associated with the casing, and slidably passed through the central opening in the guide plug is a valve stem 36 of the valve 37. The upper end of the valve stem is normally spaced a slight distance from the adjacent end of the casing 34, which distance is equal to the difference of throw between the opening and closing cams respectively, the purpose of which will be presently described. Arranged within the casing 35 and encircling the stem 36 is a coil spring 39 having one end seated upon the nut 35 and its opposite end engaging a nut 38 adjustably mounted upon the upper end of the stem 36 for the purpose of regulating the tension of the spring.

Now as the shaft 25 is rotated and the actuating surface 31 of the cam 23 brought into engagement with the projection 30, the valve actuating means including the frame 26, extension 32, and casing 34 is moved against the valve stem 36, thereby moving the valve 37 away from its seat, as shown in Fig. 5. In the normal or closed position of the valve as shown in Fig. 4 the spring 39 is compressed and under tension. When the valve is moved to open position as shown in Fig. 5 this spring is permitted to slightly expand, thereby permitting the valve stem 36 to be engaged by the upper end of the casing 34. As the shaft 35 is rotated to move the actuating surface 31 of the cam 23 out of engagement with the projection 30, the cam 24 is simultaneously rotated to bring the deepest portion of the depression 40 thereof into engagement with the projection 29 thereby moving the valve actuating means in its entirety in a direction opposite that in which it was moved by the cam 23 for the purpose of seating the valve 37. The relative dimensions and formations of the respective cams, attributes to the closing cam 24 a slightly greater throw than that possessed by the opening cam 23, and subsequent to the closing of the valve 37 by means of the cam 24, the spring 39 acts as a cushion for the throw of the closing cam, to take care of the throw of the latter, and is thereby placed under tension whereupon the various parts assume their normal position as clearly illustrated in Fig. 4. It will be clear from the foregoing description, when considered in connection with the accompanying drawings that I have devised a means whereby the valve actuating means are caused to continuously engage the cams for operating the latter, which not only eliminates considerable wear upon these parts, but renders the valve to be more easily and properly timed when the cam shaft travels at a high rate of speed.

The feature of greatest value of the invention herein described and shown resides in the fact that the cam is prevented from bottoming in relation to the valve actuating mechanism. It is evident that, if for any reason, such as the presence of carbon on the valve seat, the valve is unable to reach its seat, under the ordinary arrangement, there would be a bottoming or binding of the valve closing cam in relation to the cam opening and closing member. This would throw a very considerable strain on the valve operating mechanism and afford a great amount of resistance to the rotation of the cam shaft. The spring 21 or 39 as the case may be, compensates for this variation of the throw in the valve, while permitting the valve closing cam to continue smoothly in its operation without any binding effect or excess friction, thereby maintaining the efficiency of the engine in actual operation.

The purpose of the spring or yieldable means is to allow the closing cam to be made with a slightly greater throw so as to insure the closing of the valve without any possibility of the cam bottoming in relation to the valve actuating means when the valve strikes its seat or approaches the same as closely as any obstructing carbon or other matter will permit. The salient feature of the valve operating mechanism resides in the positive opening and closing of the valve at all speeds of the motor, more accurate timing of the valves, and the use of only sufficient power to operate the valve as compared with the device now in general use in which the valve closing spring must necessarily be more powerful than is needed to close the valve in order that the tappet will follow the cam. The cam has to overcome the power exerted by such strong spring and in addition thereto the pressure within the cylinder. Under the present invention herein set forth the spring or yieldable means allows the closing cam to hold the valve to its seat through the medium of the valve actuating means.

While I have shown and described several embodiments of the invention I desire to have it understood that I do not limit myself to this precise construction and arrangement of parts, and that various changes may be resorted to when desired as fall within the scope of the appended claims.

What is claimed is:

1. The combination with a cylinder of an internal combustion engine, and a valve therefor, of a valve operating mechanism including opening and closing cams, valve actuating means operable by said opening and closing cams, and yieldable means between the valve and valve actuating means, one of said cams not being affected by the tension of said yieldable means when the valve is open, and the other of said cams having a greater throw to place said yieldable means under tension.

2. The combination with a cylinder of an internal combustion engine, and a valve therefor, of a cam-controlled valve mechanism including a valve-actuating means operatively associated with the valve and adapted to engage the opening and closing cams, a yieldable means operating to hold said valve-actuating means in continuous engagement with the closing cam, the latter having a greater throw than the opening cam for compressing and placing said yieldable means under tension as described.

3. The combination with a cylinder of an internal combustion engine, and a valve therefor, of valve-actuating means including a pair of spaced parallel rocking arms, one of said arms being terminally associated with the stem of the valve, said stem being slidably fitted in the adjacent end of the other of said arms, a cam for operating one of said arms to open the valve, a second cam operating on the other arm to close said valve, and yieldable means interposed between said arms operating to hold the valve closing arm in continuous engagement with the closing cam, one of said cams having a greater throw than the other for compressing and placing said yieldable means under tension.

4. The combination with a cylinder of an internal combustion engine, and a valve therefor, of valve actuating means including a pair of rocking arms, a cam for operating one of said arms to open the valve, a second cam for operating the other arm to close said valve, and yieldable means operating to hold the valve closing arm in continuous engagement with the closing cam, one of said cams having a greater throw than the other for compressing and placing said yieldable means under tension.

5. The combination with an engine valve, of opening and closing cams for said valve, valve-actuating means, and yieldable means between the valve and valve-actuating means serving to prevent the closing cam from bottoming in relation to the valve-actuating means, said yieldable means having no effect between the cams and valve-actuating means when the valve is unseated, the closing cam having a greater throw than the opening cam and serving to compress the yieldable means when the valve reaches the limit of its closing movement.

In testimony whereof, I affix my signature in the presence of two witnesses.

FRANK MacVICAR.

Witnesses:

CHARLES MacVICAR,
EDITH M. MacVICAR.